(12) United States Patent
Loegering et al.

(10) Patent No.: US 7,255,184 B2
(45) Date of Patent: Aug. 14, 2007

(54) TRACK ASSEMBLY

(75) Inventors: George A. Loegering, Casselton, ND (US); Ronald S. Hansen, Kindred, ND (US); Steven W. Loegering, Casselton, ND (US)

(73) Assignee: Loegering MFG, Inc., Casselton, ND (US)

( * ) Notice: Subject to any disclaimer, the term of this patent is extended or adjusted under 35 U.S.C. 154(b) by 0 days.

(21) Appl. No.: 10/751,101

(22) Filed: Jan. 2, 2004

(65) Prior Publication Data

US 2005/0145422 A1 Jul. 7, 2005

(51) Int. Cl.
*B62D 55/04* (2006.01)
(52) U.S. Cl. .................. 180/9.26; 180/9.21; 180/9.28; 180/9.62
(58) Field of Classification Search ............... 180/9.21, 180/9.26, 9.28, 9.5, 9.52, 9.58, 9.62
See application file for complete search history.

(56) References Cited

U.S. PATENT DOCUMENTS

| 1,348,315 A | * | 8/1920 | Peck ........................ 180/6.7 |
| 3,664,449 A | | 5/1972 | Vardell |
| 3,682,266 A | | 8/1972 | Stoliker |
| 3,710,886 A | | 1/1973 | Wagner |
| 3,737,001 A | * | 6/1973 | Rasenberger ............... 180/9.21 |
| 4,448,273 A | * | 5/1984 | Barbieri ..................... 180/9.21 |
| 4,459,932 A | * | 7/1984 | Hildebrand ............. 440/12.64 |
| 4,865,141 A | * | 9/1989 | Gey .......................... 180/9.26 |
| 5,018,591 A | * | 5/1991 | Price .......................... 180/9.5 |
| 5,273,126 A | | 12/1993 | Reed et al. |
| 5,343,960 A | | 9/1994 | Gilbert |
| 5,361,860 A | * | 11/1994 | Smith et al. ............... 180/9.21 |
| 5,855,248 A | * | 1/1999 | Rawson et al. ............ 180/9.21 |
| 6,135,220 A | * | 10/2000 | Gleasman et al. ........... 180/9.1 |
| RE37,174 E | * | 5/2001 | Grawey et al. ............ 180/9.21 |
| 6,543,862 B1 | | 4/2003 | Kahle et al. |
| 6,854,540 B2 | * | 2/2005 | McKinnon .................. 180/9.1 |
| 2002/0017403 A1 | | 2/2002 | Phely |

* cited by examiner

*Primary Examiner*—Lesley D. Morris
*Assistant Examiner*—Mark A. Scharich
(74) *Attorney, Agent, or Firm*—Moore & Hansen, PLLP

(57) ABSTRACT

A track assembly having first and second hub assemblies that are operatively connected to a support frame by first and second attachment members, respectively. The first and second attachment members include resilient or movable mounts that are configured so that the track assembly can be attached to vehicles whose axles or wheel flanges are misaligned or have irregular rotational movement such as runout or wobble. The attachment members may be adjustably positioned relative to the support frame to accommodate vehicles having different wheelbase lengths and axle lengths. An endless track encircles the first and second hub assemblies, and the support frame, and is drivingly engaged by one of the hub assemblies. First and second rollers, which define the longitudinal extent of the endless track, are positioned at either end of the support frame. A tensioning member, with at least one upper idler roller, positions the endless track so that it is spaced from one of the hub assemblies in a spaced relation. The track assembly increases traction and stability by providing a vehicle with an independent front suspension, a larger footprint, and a longer wheelbase. In use, each track assembly is bolted onto wheel flanges of a vehicle using existing wheel lugs and nuts.

41 Claims, 13 Drawing Sheets

TRACK ASSEMBLY

FIELD OF THE INVENTION

The present invention relates generally to wheeled vehicles. More particularly, the present invention relates to a track assembly that may be used to convert construction equipment such as wheeled skid-steer loaders into tracked skid-steer loaders.

BACKGROUND OF THE INVENTION

Skid-steer loader machines are old and well known to the art. Originally designed to operate with only a loading scoop or a bucket, these machines have, with the provision of specifically designed attachments, evolved into multi-purpose machines capable of many diverse operations. Nowadays, a skid-steer loader machine may be configured to operate as a street sweeper, a posthole digger, a trencher, or a forklift, for example. As the number of applications of skid steer loaders increases, they may be found in use in many different environments. Often, they are used in conditions where the surface upon which they traverse is not capable of supporting the weight of the skid-steer loader and they can become mired and/or lose traction.

These drawbacks can be overcome by using vehicles having permanently installed tracks, or by removing the wheels of a wheeled vehicle and replacing them with a unitary tracked undercarriage. A problem with permanent tracked vehicles is that they are not designed to be converted to wheeled vehicles. A problem with undercarriage systems is that they are also designed with permanence in mind, and they are not easily removed after they have been installed. In addition, they are usually designed for use with a particular vehicle make and model, and are not easily transferable from one vehicle to another vehicle.

Other solutions include providing the skid steer loader with a pair of auxiliary endless tracks that are positioned about the front and rear wheels on either side of the vehicle, or replacement the wheels of a skid steer loader with a sprocket and a system of rollers, about which a rubber track is installed. Each of these solutions also has its own set of drawbacks. With the auxiliary track solution, the pneumatic tires, about which the track is positioned, often do not have the same circumference. This can be due to different wear patterns, unmatched sets of tires, or different inflation pressures, for example. Since the front and rear wheel axles rotate at the same speed and direction (for straight line motion) the front and rear wheels, having different circumferences, will have different ground speeds. This means that friction and abrasion will be generated between the wheels and the track, which can lead to undue tire wear and even premature failure. An additional drawback is that such track add-ons are usually designed to fit a particular skid-steer loader having a predetermined wheelbase length, a predetermined axle length, and a predetermined tire size. With the replacement track solution, extensive modifications are often required. Moreover, the removal of the pneumatic tires often results in a harsher ride.

Another related drawback to existing add-on track attachments is that when the front arms of the vehicle exert a downward pressure on an implement to which they are attached, the front end of the vehicle is lifted up. This reduces the ground contact area of the track and the vehicle looses traction. Moreover, when a vehicle is tipped back on its rear wheels it becomes more difficult to control.

There is a need for track assembly that is able to convert a wheeled vehicle into a tracked vehicle. There is a need for a track assembly that can be attached to existing wheel flanges using lugs and bolts, and which requires no modification or disassembly of the vehicle. There is a need for a track assembly that can be adjusted for use with different wheeled vehicles models and makes. There is also a need for a track assembly that can accommodate a vehicle that has misaligned wheel axles, or wheel flanges, or which can accommodate variations in axle or wheel flange rotation such as runout or wobble, and misalignment. There is yet another need for a track assembly that is able to maintain full ground contact while allowing the front end of the body of the vehicle to be elevated. And, there is a need for a track assembly that is able to attenuate jolts and vibrations from being transmitted directly to the vehicle.

SUMMARY OF THE INVENTION

Generally, the present invention is a track assembly for converting a wheeled vehicle to a tracked vehicle. The track assembly includes a first hub and a second hub that are adjustably connected to an elongated support frame by first and second attachment members. An endless track encircles, and is drivingly engaged by one of the first and second hubs. The first and second attachment members include resilient or movable mounts that are configured so that the track assembly can be attached to vehicles whose axles or wheel flanges are misaligned, or which have runout or wobble. The attachment members may also be adjustably positioned relative to the elongated support frame so that the track assembly can accommodate vehicles having different wheel base lengths and axle lengths. The track assembly increases traction and stability by providing a vehicle with an independent front axle suspension system, a larger footprint, and a longer wheelbase. In use, each track assembly is bolted onto wheel flanges of a vehicle using existing wheel lugs and nuts More specifically, the first (or rear) and second (or front) hub assemblies are configured to be attached to the wheel flanges of a vehicle whose wheels have been removed. Each of the hub assemblies includes an adaptor disc and a spindle, and each spindle of each hub assembly rotatably mounted to a bushing. Each adaptor disc includes a plurality of apertures that are configured and arranged so that they can accommodate the standardized wheel lug or bolt patterns of the wheel flanges. The first hub assembly adaptor disc also includes an additional circumferential flange, which includes inner and outer attachment surfaces and a second plurality of apertures that are configured and arranged to correspond with apertures of a removable drive sprocket. The drive sprocket has an attachment surface and a track receiving surface that define planes, which are offset with respect to each other. In use the drive sprocket may be removably attached to either one of the inner or outer attachment surfaces of the circumferential flange of the adaptor disc, to enable the track assembly to be attached to different vehicles.

First and second attachment members operatively connect the first and second hub assemblies to a support frame, respectively. Each of the first and second attachment members comprises a housing or body having a base with mounting apertures, and a through hole that receives the bushing to which the respective hub assembly is rotatably mounted. Each of the attachment members may be configured so that they can accommodate variations in axle or wheel flange rotation such as runout or wobble, and misalignment. Preferably, a sleeve of resilient material is positioned between the inner surface of the through hole and the outer surface of the bushing. The inner sleeve of resilient material enables the attachment members to accommodate misaligned axles or wheel flanges and/or axles or wheel flanges that have rotational variations such as wobble and runout.

Alternatively, each of the first and second attachment members may be provided with an aperture and a trunnion (or pin) that are configured and arranged to engage a corresponding trunnion and collar that are coaxially aligned with each other, and which extend in a radial direction from respective hub assembly bushings in opposite directions. The aligned apertures, trunnions, and collars serve to rotatably connect the first and second hub assemblies to their respective attachment members, which in turn are attached to the support frame. Preferably, the rotatable connections formed by the apertures, trunnions, and collars of the respective attachment members and hub assembly bushings are aligned along generally vertical axes.

The manner in which the first and second attachment members are connected to support frame differ from each other. The first attachment member is attached to a first adaptor plate that has a plurality of mounting apertures, which are located at both ends of the first adaptor plate in parallel, linear arrangements. The support frame has similar parallel linear arrangements of mounting apertures. However, the distance between the mounting apertures in the first adaptor plate and the distance between the mounting apertures in the support frame are different. This difference permits the first adaptor plate to be adjusted along the length of the support frame in discrete increments that can be less than the distances between the mounting holes of either the first adaptor plate or the support frame. In addition, the support frame may be constructed of adjustable elongated sections, which permit the length of the support frame to be modified when the degree of adjustment needed to attach the track assembly onto a vehicle exceeds the degree of longitudinal adjustment that is possible using the first adaptor plate.

A feature of the first adaptor plate is that the mounting apertures are located off-center with respect to the longitudinal axis of the first adaptor plate. This permits the first adaptor plate to be adjusted transversely with respect to the support frame by either inverting the plate (so that the bottom surface faces up) or by turning it around (so that the front and rear ends of the first adaptor plate point towards the rear and front ends, respectively, of the support frame). It will be understood that whenever the first adaptor plate is repositioned, the first attachment member must also be repositioned.

Similarly, the second attachment member is attached to a second adaptor plate that has a plurality of mounting apertures. However, unlike the first adaptor plate for the first attachment member, the mounting apertures of the second adaptor plate only permit adjustment in a transverse direction relative to the support frame. The second adaptor plate is operatively connected to a torsional bushing system that is linked to the support frame and which pivots with respect thereto. Preferably, the torsional bushing system comprises a square tube into which a square shaft and a plurality of resilient elements are positioned. In operation, when the shaft rotates relative to the tube, the resilient elements are compressed and rotation is prevented (see, U.S. Pat. No. 3,601,424, for example).

An endless track is positioned about the first and second hub assemblies and is maintained in a predetermined configuration by a drive sprocket, first and second rollers located adjacent the ends of the support frame, and a tensioning member that guides the endless track over the second hub assembly.

An object of the present invention is to provide a track assembly that can be used to convert a wheeled vehicle into a tracked vehicle.

Another object of the invention is to increase the handling and stability of a wheeled vehicle.

Yet another object of the present invention is to simplify installation of a track assembly by limiting the points of attachment to the wheel flanges of a vehicle.

A feature of the present invention is that the track assembly is able to accommodate wheeled vehicles having different wheelbase lengths and axle lengths.

Another feature of the invention is that the track assembly is able to accommodate wheeled vehicles with wheel axles that are misaligned or wheel flanges that have irregular rotational movement such as runout or wobble.

Yet another feature of the present invention is that installation is non-permanent and reversible.

An advantage of the present invention is that the track assembly can be transferred from one vehicle to another vehicle.

Another advantage of the invention is that traction and stability are increased by effectively lengthening the wheelbase of a vehicle.

Another advantage of the invention is that traction and stability are increased by providing the vehicle with an independent front suspension system.

These and other objectives and advantages of the invention will appear more fully from the following description, made in conjunction with the accompanying drawings wherein like reference characters refer to the same or similar parts throughout the several views. And, although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

DETAILED DESCRIPTION

Figure 1:
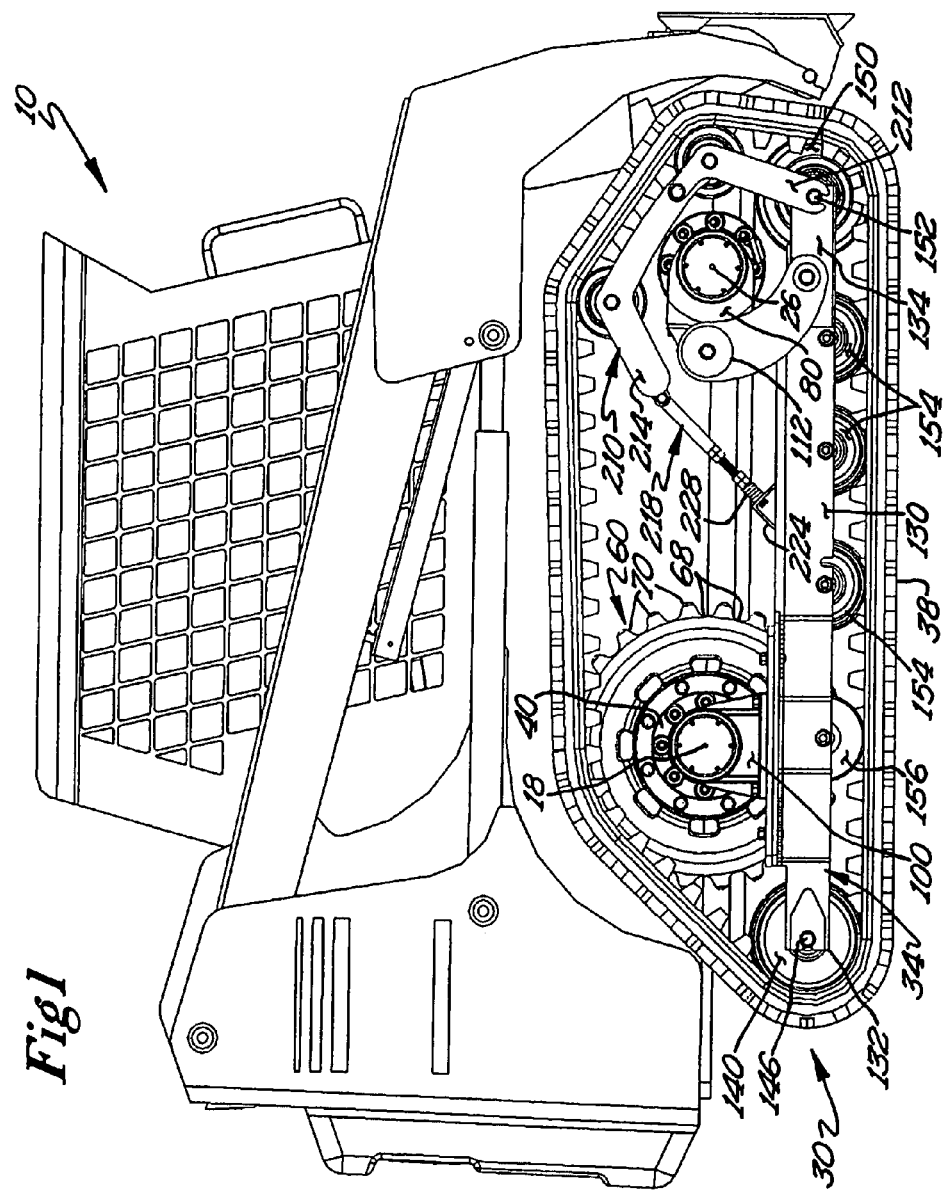
FIG. 1 is a side plan view of an embodiment of a track assembly as it may appear when it is attached onto a four wheeled loader.

A generic skid-steer vehicle 10 having a track assembly 30 attached thereto in lieu of wheels is depicted in FIG. 1. Generally, the track assembly 30 comprises an apparatus or track carrier 34 and an endless track 38. More specifically, the apparatus 34 of the track assembly comprises a first hub assembly 40 and a second hub assembly 80 that are operatively connected to a support frame 130 by first and second attachment members 100, 112, respectively. Note that the distance between the rotational axes of the first and second hub assemblies are coincident with the rotational axes of the wheel axle axes to which they are attached.

First and second rollers 140, 150 are operatively connected adjacent opposing ends 132, 134 of the support frame 130 and serve to support the vehicle and to define the ground contacting extent of the endless track 38. The first and second rollers 140, 150 also redefine the wheelbase of the vehicle. Note the rotational axes 146 and 152 of the first and second rollers 140 and 150 are spaced from each other by a distance that is greater than the distance between the rotational axes of the first and second hub assemblies 40 and 80. As will be appreciated, this increases the stability and handling characteristics of the vehicle.

A tensioning member 210 is operatively connected to the support frame 130 and upper idler rollers 230 that serve to position the endless track 38 above the second hub assembly 80 in a non-contacting relation. One end 212 of the tensioning member is pivotally connected to the support frame 130 while the other end 214 of the tensioning member 210 is movably adjustable relative thereto by an adjustment mechanism 218. The adjustment mechanism 218 comprises a shaft 220 having one end that is pivotally connected to the tensioning member 210 at connection point 216 and another end that is provided with a threaded shaft 222 having a free end. The free end of the threaded shaft 222 is received within an aperture in an angled extension 224. The threaded shaft 222 is provided with one or more nuts 226 that are used to adjust a resilient member 228 that is positioned on the threaded shaft 222 adjacent the angled extension 224. The force of the resilient member 228 that is imparted to the tensioning member 210 can be adjusted by moving the nuts 226 along the threaded shaft 222 (see also, FIGS. 3, 12 and 13).

An endless track 38 encircles the first and second hub assemblies 40 and 80, the first and second rollers 140 and 150, and the tensioning member 210 of the apparatus 34. The endless track 38 is engaged by one of the hub assemblies, preferably the first hub assembly 40.

Figure 2:
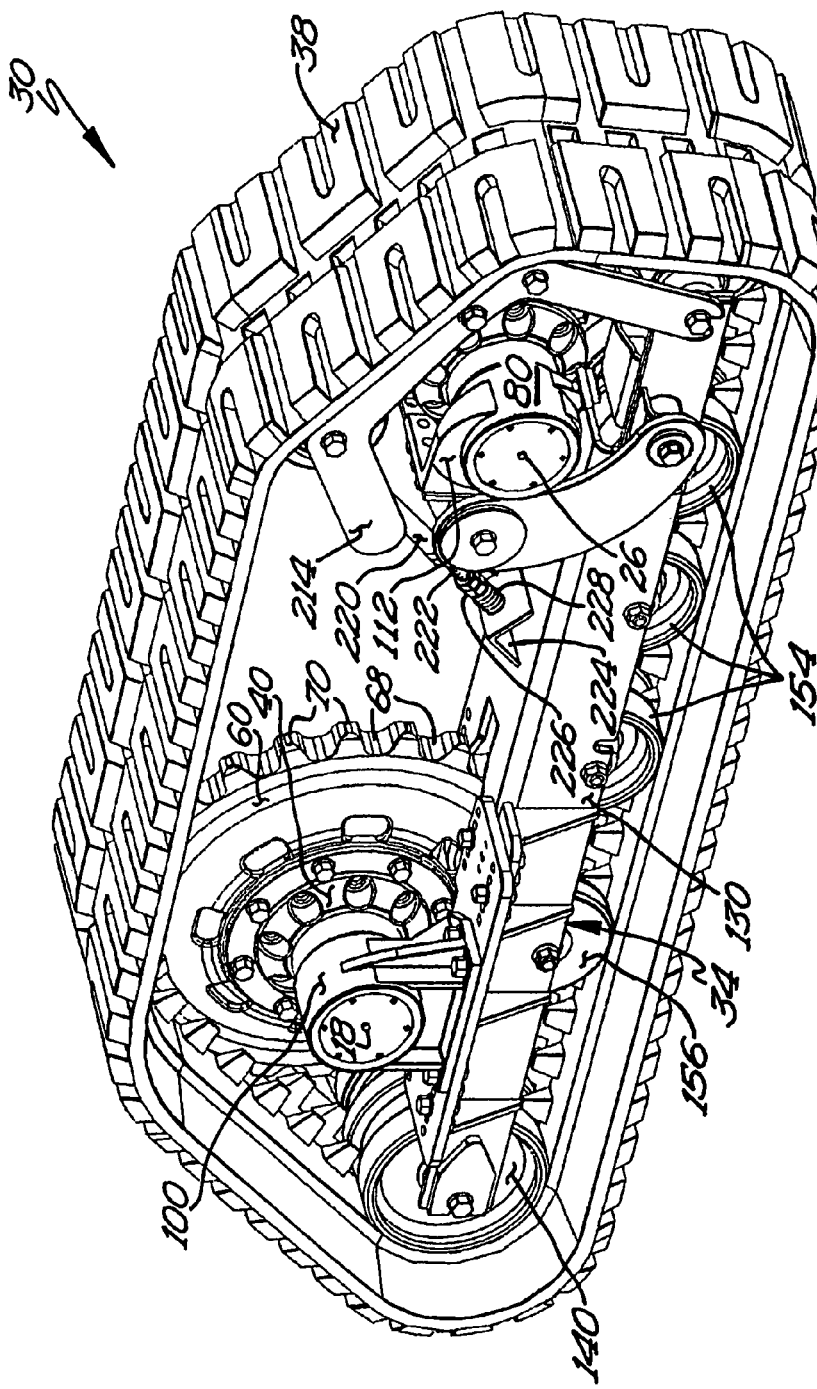
FIG. 2 is a perspective view of the track assembly of FIG. 1, viewed apart from the four wheeled loader.

The first hub assembly 40 and the first attachment member 100 can be seen in greater detail in FIG. 2. Engagement of the endless track 38 by the first hub assembly 40 is achieved by a sprocket 60, which is removably attached thereto. As will be discussed later, the sprocket 60 is configured and arranged so that it may be reversibly attached to the first hub assembly 40. As will be discussed later in greater detail, the first attachment member 100, to which the first hub assembly 40 is connected, is adjustably attachable to the support frame 130 in one of several discrete positions along the length and width thereof.

The support frame 130 itself comprises an elongated section that has a generally u-shaped cross-section. As can be seen, the support frame 130 is configured and arranged to rollingly retain the first and second rollers 140 and 150, as well as a plurality of support rollers 154. The second attachment member 112 is attached to an articulating connection 192 that is movably connected to the support frame 130. As will be discussed later, the articulating connection 192 attenuates jolts and vibrations that are generated when the vehicle travels over uneven ground. The articulating connection 192 also allows the vehicle body to rear back on the first roller 140 while the second roller 150 maintains contact with the ground. This provides the vehicle with greater traction and control over a greater range of operating conditions than is possible with a wheeled vehicle that has been provided with an endless track.

Figure 3:
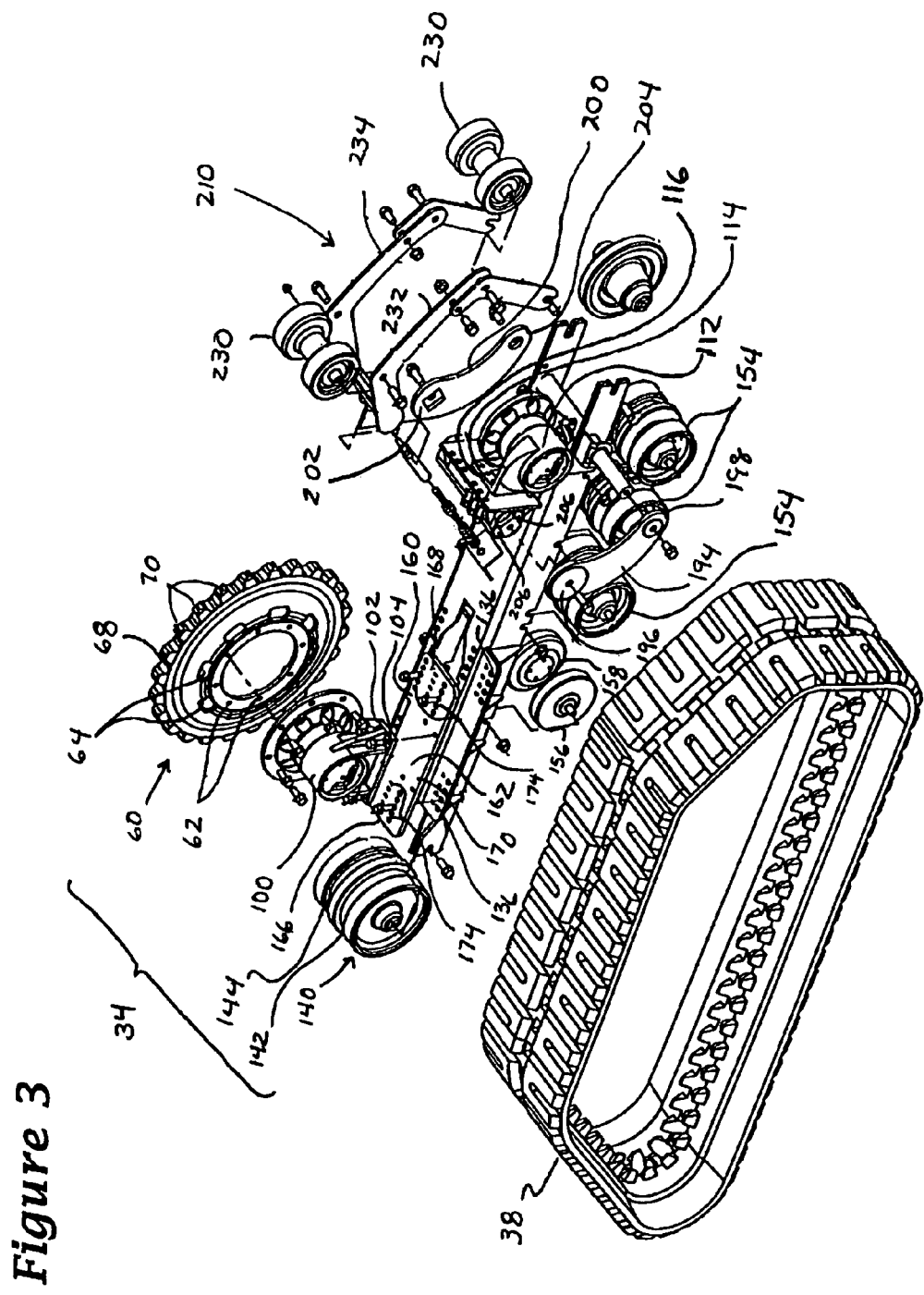
FIG. 3 is an exploded perspective view of the track assembly of FIG. 1, viewed apart from the four wheeled loader.

The various components of the apparatus or track carrier 34 are depicted in greater detail in FIG. 3. As shown, the sprocket 60 is in the form of a ring having track receiving surface 68 comprising a plurality of radially extending projections 70 that are configured and arrange to drivingly engage the endless track 38. The sprocket 60 is provided with two sets of apertures 62 and 64 that are arranged in concentric rings about the center of rotation. The innermost set of apertures 62 is used to attach the sprocket 60 to the hub assembly 40, while the outermost set of apertures 64 is used as sight holes during installation of the track assembly onto a vehicle wheel flange.

The first attachment member 100, which is adjustably connected to the support frame 130, is provided with a body or housing 102 having a through hole 104, and a base 106 that has attachment apertures 108 that permit the first attachment member 100 to be attached to a first adaptor plate 160 in one of several orientations. As will be discussed later in greater detail, the first adaptor plate 160 allows the first attachment member 100 to be attached to the support frame 130 in various longitudinal as well as a transverse directions using conventional fastening elements (not shown).

The first attachment member 100 is attached to a first adaptor plate 160 has a top surface 162, a bottom surface 164, a opposing ends 166 and 168, opposing sides 170 and 172 and a plurality of mounting apertures 174, which are located at both ends 166 and 168 of the first adaptor plate 160 in parallel, linear arrangements. The support frame 130 has similar parallel linear arrangements of mounting apertures 136. However, the distance between the mounting apertures 174 in the first adaptor plate and the distance between the mounting apertures 136 in the support frame are different. This difference permits the first adaptor plate 160 to be adjusted along the length of the support frame 130 in discrete increments that can be less than the distances between the mounting apertures of either the first adaptor plate or the support frame A feature of the first adaptor plate 160 is that the mounting apertures 174 are located off-center with respect to the longitudinal axis of the first adaptor plate 160. This permits the first adaptor plate 160 to be adjusted transversely with respect to the support frame 130 by either inverting the adaptor plate (so that the bottom surface 164 faces up) or by turning it around (so that the front and rear ends 166, 168 of the first adaptor plate point towards the rear and front ends 132, 134, respectively, of the support frame 130). It will be understood that whenever the first adaptor plate 160 is repositioned, the first attachment member 100 must also be repositioned.

The second attachment member 112, which is also adjustably connected to the support frame 130, is limited to adjustments in the transverse direction. The second attachment member 112 is provided with a base 114 having attachment apertures 116 that permit the second attachment member 112 to be operatively connected to a suspension system 190 using fastening elements 118. As depicted, the suspension system 190 comprises a square tube that is sized to rotatingly receive a square rod. The ends of the square rod are splined to ends 196, 202 of first and second arms 194, 200, whose opposing ends 198 and 204 are pivotally attached to the support frame 130. Resilient inserts 206, positioned between the outer surface of the square rod and the inner surface of the square tube, resist rotation of the square rod relative to the square tube. Together, the square tube, square rod, resilient members 206, first and second arms 194, 200, and the second support member 112, form an articulating connection 192.

The tensioning member 210, which supports the endless track 38 above the second hub assembly 80, has a first end 212 and a second end 214, and comprises a pair of spaced apart, generally u-shaped arms 232, 234. First ends of the unshaped arms 232, 234 are pivotally connected to the support frame 130, while second ends are movably connected to the support frame 130 by an adjustment mechanism 218. The shaped arms 232, 234 are configured and arranged to rollingly support two upper idler rollers 230 that are configured to engage the endless track 38 so that it is spaced from the second hub assembly 80 in a non-contacting relation. Preferably, the tensioning member 210 imparts a forward slant to the endless track 38 so that it is better able to negotiate vertical obstacles.

As can be seen, first and second rollers 140 and 150 are configured differently. The first roller 140 includes a plurality of grooves 142, 144 that are configured and arranged to accommodate two rows of guide teeth on the inner surface of the endless track 38, while the front roller 150 is designed to ride between the two rows of guide teeth of the endless track. The forwardmost support rollers 154, which are positioned between the first and second rollers 140 and 150 are configured and arranged to accommodate the two rows of guide teeth on the inner surface of the endless track, while the rearmost support wheels 156 and 158 are separately mounted to the side walls of the support frame 130. This is done to provide clearance for the sprocket 60. The rearmost support wheels 156, and 158 also reduce chatter in the endless track 38 when the vehicle is in motion.

Figure 4:
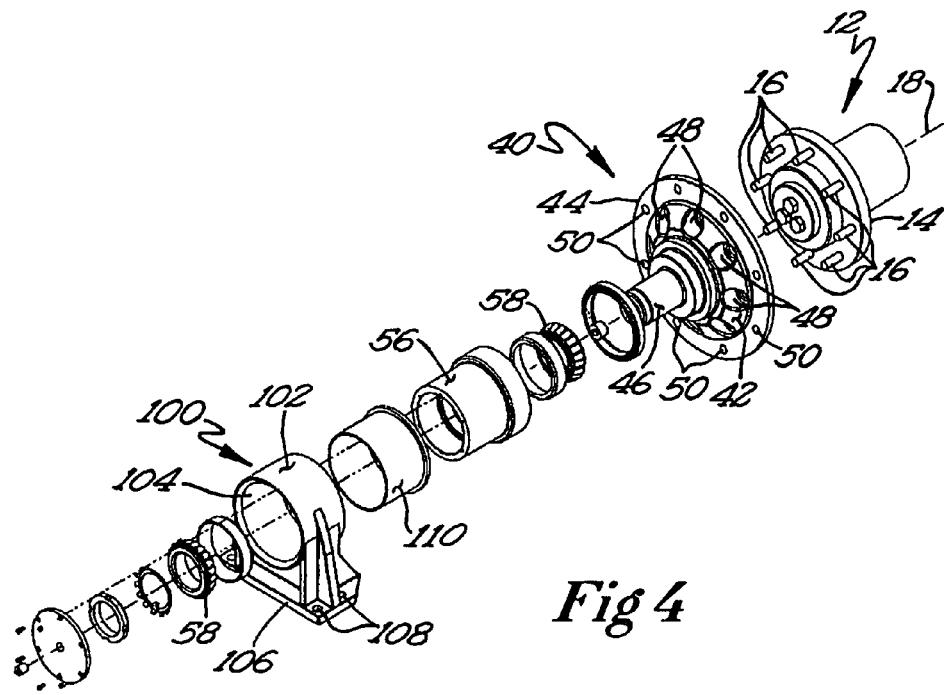
FIG. 4 is an exploded, partial perspective view of an embodiment of a hub assembly and a wheel flange of a vehicle whose wheel has been removed.
Figure 5:
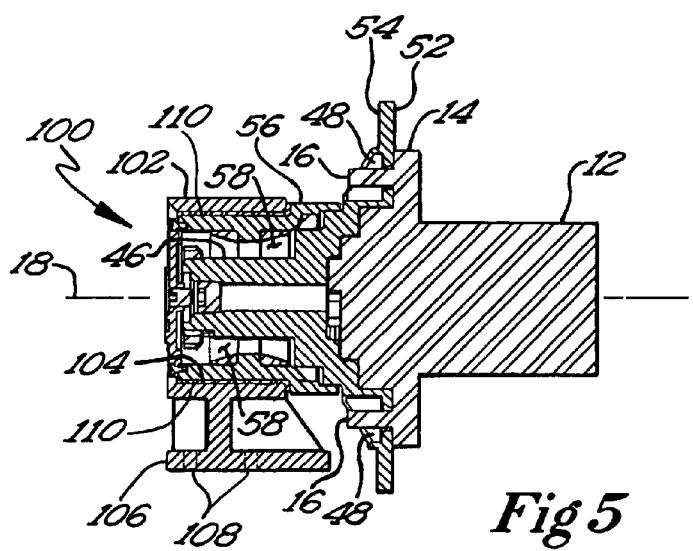
FIG. 5 is a partial, cross-sectional, assembled view of the embodiment of FIG. 4.

An embodiment of the first hub assembly 40 and the first attachment member 100 are depicted in FIGS. 4 and 5. Starting on the right side of FIG. 4, a wheel axle 12 having a wheel flange 14 and a plurality of lugs 16 are depicted. To the left is a hub assembly 40 comprising an adaptor disc 42 with a circumferential flange 44 a spindle 46. The adaptor disc 42 is provided with two sets of apertures 48 and 50 that are arranged in concentric rings about the axis of rotation 18. The innermost set of apertures 48 is used to attach the adaptor disc 42 to the wheel flange 14 of a vehicle (see FIG. 5, note that the wheel lug nuts have been omitted), while the outermost set of apertures 50, located on the circumferential flange 44 is used to attach the sprocket 60 thereto (see, for example, FIG. 3). The hub assembly 40 is rotatably mounted to a bushing 56 using conventional bearings 58. A sleeve 110 of resilient material is positioned between the exterior surface of the bushing 56 and the inner surface of the through hole 108 of the first attachment member 100. This permits movement between the first hub assembly 40 and the first attachment member 100, wherein the track assembly is able to accommodate wheel axles that are misaligned, or wheel flanges that have irregular rotational movement such as runout and wobble. Preferably, the sleeve 110 of resilient material is elastomeric. Optionally, the sleeve of resilient material may be provided with differential durometer hardness rates to enable the resilient material to preferentially flex in certain directions. For example, the durometer rates could be higher for the upper and lower portions of an installed sleeve, while the durometer rates could be lower in the forward and rearward portions of the installed sleeve. It will be appreciated that the second hub assembly 80 and the second attachment member 112 are similarly constructed, only that with the second hub assembly 80 the adaptor disc does not have a circumferential flange. Thus, the second hub assembly will not be discussed in detail.

Figure 6:
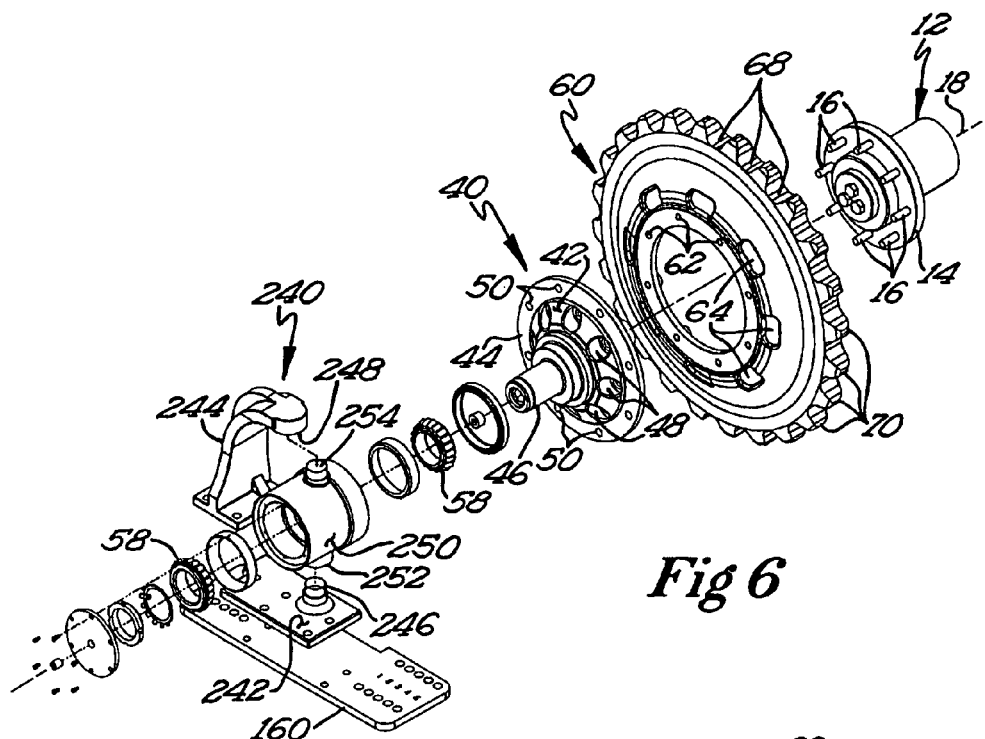
FIG. 6 is an exploded, partial perspective view of another embodiment of a hub assembly and wheel flange of a vehicle whose wheel has been removed.
Figure 7:
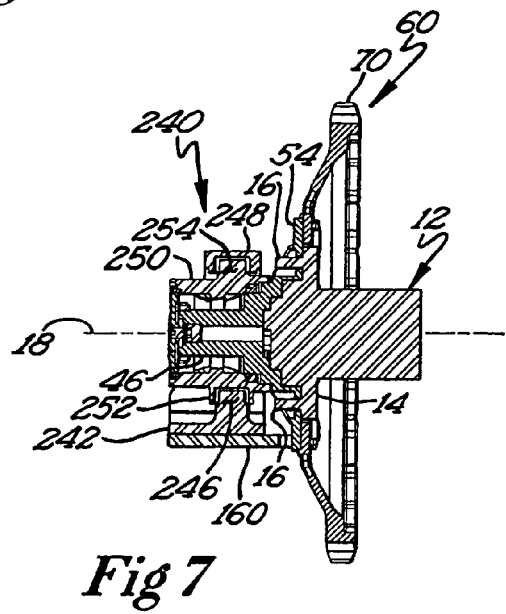
FIG. 7 is a partial, cross-sectional, assembled view of the embodiment of FIG. 6.

An alternative embodiment of the first hub assembly and the first attachment member are depicted in FIGS. 6 and 7. Starting on the right side of FIG. 6, a wheel axle 12 having a wheel flange 14 and a plurality of lugs 16 are depicted. To the left is a hub assembly 40 comprising an adaptor disc 42 with a circumferential flange 44 a spindle 46. The adaptor disc 42 is provided with two sets of apertures 48 and 50 that are arranged in concentric rings about the axis of rotation. The innermost set of apertures 48 is used to attach the adaptor disc 42 to the wheel flange 14 of a vehicle (see FIG. 7, note that the wheel lug nuts have been omitted), while the outermost set of apertures 50, located on the circumferential flange 44 is used to attach the sprocket 60 thereto (see, for example, FIG. 3). As with the first embodiment, the hub assembly 40 is rotatably mounted to a bushing using conventional bearings 58.

Instead of having a sleeve of resilient material that accommodates irregular rotational movement, this embodiment features a pivotal connection. As depicted, the first attachment member 240 comprises two parts, with the first part 242 serving as the base, and the second part 244 attached thereto. The first part 242 includes a trunnion 246, while the second part includes a socket 248, with the trunnion and the socket in axial alignment with each other. The bushing 250, which is attached to the first attachment member 240, is provided with a collar 252 and a trunnion 254, with the collar 252 of the bushing 250 configured to rotatably receive the trunnion 246 of the first part 242 of the attachment member 240, and with trunnion 254 of the bushing 250 configured to be rotatably received by the socket 248 of the second part 244 of the attachment member 240. As will be understood, the pivotal connection permits movement between the first hub assembly 40 and the first attachment member 240, and the track assembly is able to accommodate wheel axles that are misaligned, or wheel flanges that have irregular rotational movement such as runout and wobble. It will be appreciated that the second hub assembly and the second attachment member of this embodiment are similarly constructed, only that with the second hub assembly, the adaptor disc does not have a circumferential flange. Thus, the second hub assembly of this embodiment will also not be discussed in detail. It will be understood that the resilient material could also be in the form of mechanical springs, or fluidic suspension, for example.

Figure 8:
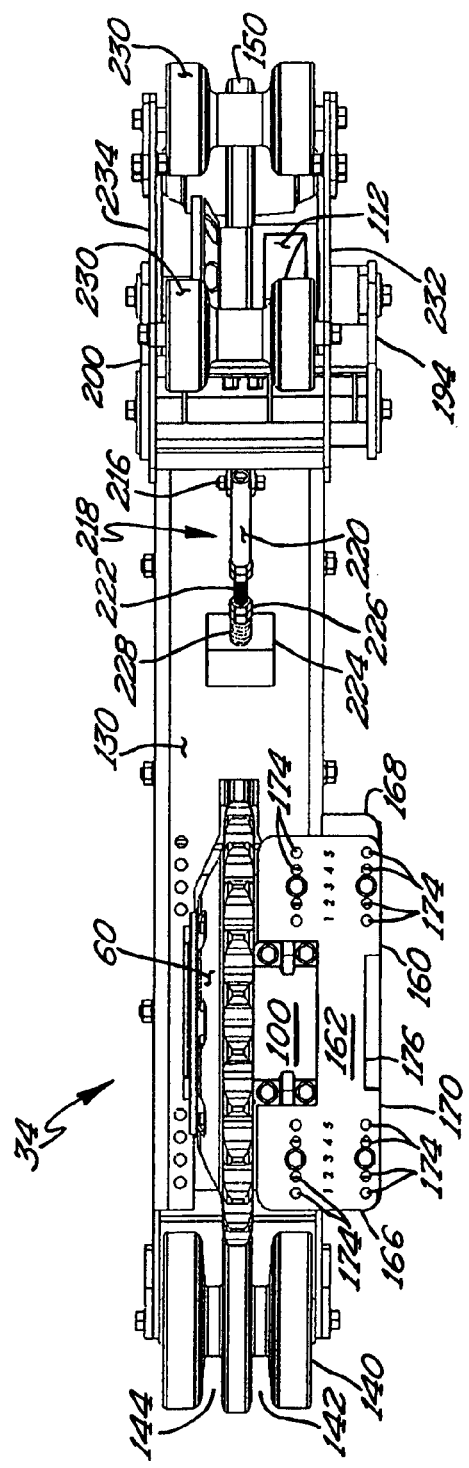
FIG. 8 is a partial top plan view of the support frame of the track assembly, with the apparatus configured for attachment to vehicles having short axle lengths.
Figure 9:
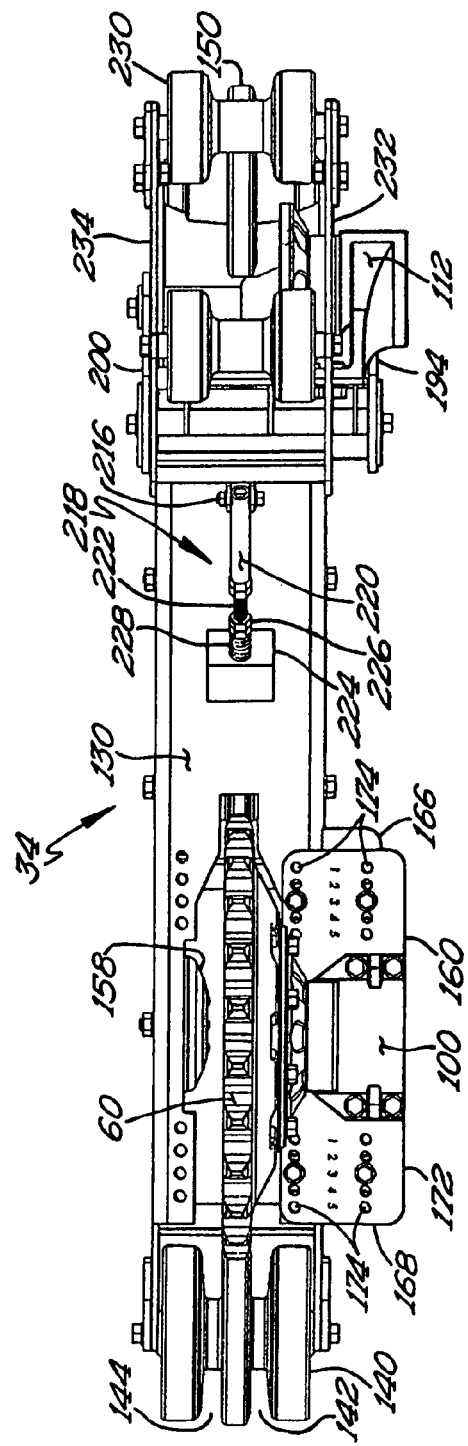
FIG. 9 is a partial top plan view of the support frame of the track assembly of FIG. 8, in which the apparatus is configured for attachment to vehicles having long axle lengths.

One of the features of the present invention is that it can be attached to vehicles having different axle lengths and wheelbase lengths. In FIG. 8, the apparatus or track carrier 34 is depicted as it may be configured for attached to a vehicle having a short axle length. Here, the first attachment member 100 and second attachment member 112 are connected to the support frame 130 in an inboard position. In FIG. 9, the apparatus or track carrier 34 is depicted as it may be configured for attachment to a vehicle having a long axle length. Here, the first and second attachment members 100 and 112 are connected to the support frame 130 in an outboard location.

Figure 10:
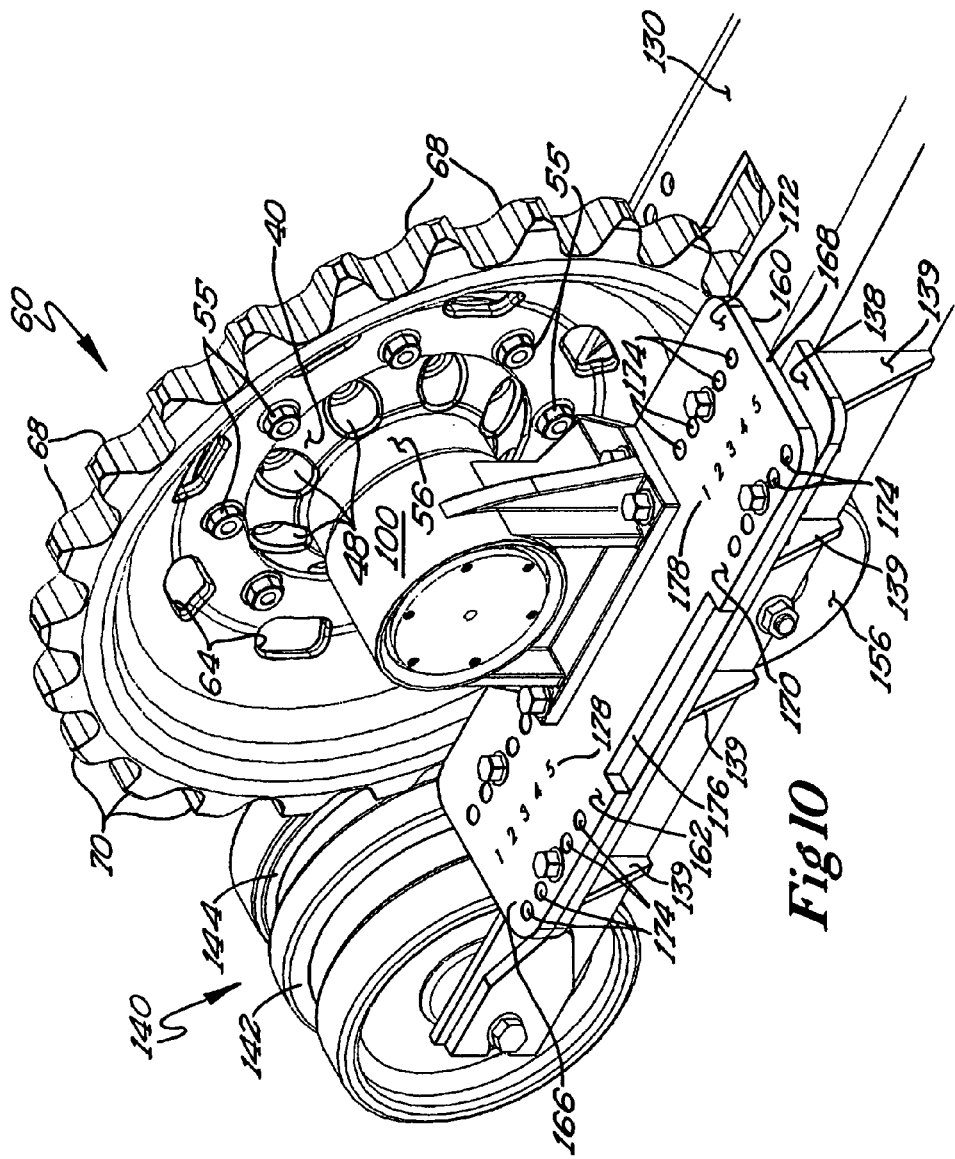
FIG. 10 is a partial, enlarged perspective view of the first or rear hub assembly and the first attachment member of FIG. 8.

FIG. 10 illustrates, in greater detail, the first attachment member 100 as it may be configured for vehicles having a short axle length. For attachment to a short axle length vehicle, the sprocket 60 is attached to the outer attachment surface 54 of the circumferential flange of the first hub assembly (see, FIG. 7) using fastening elements 55. This positions the sprocket 60 so that the plane of the track receiving surface 68 is offset outwardly away from the vehicle. Meanwhile, the first attachment member 100 is positioned adjacent one side 172 of the adaptor plate 160 so that it partially extends therebeyond. Note, in this instance, the cutout 176 is on the outboard side 170 of the adaptor plate 160. Additional support for the adaptor plate 160 my be provided by an extension or flange 138 having a plurality of mounting apertures (see, FIG. 3) and one or more gussets 139, which are attached to the support frame 130.

Figure 11:
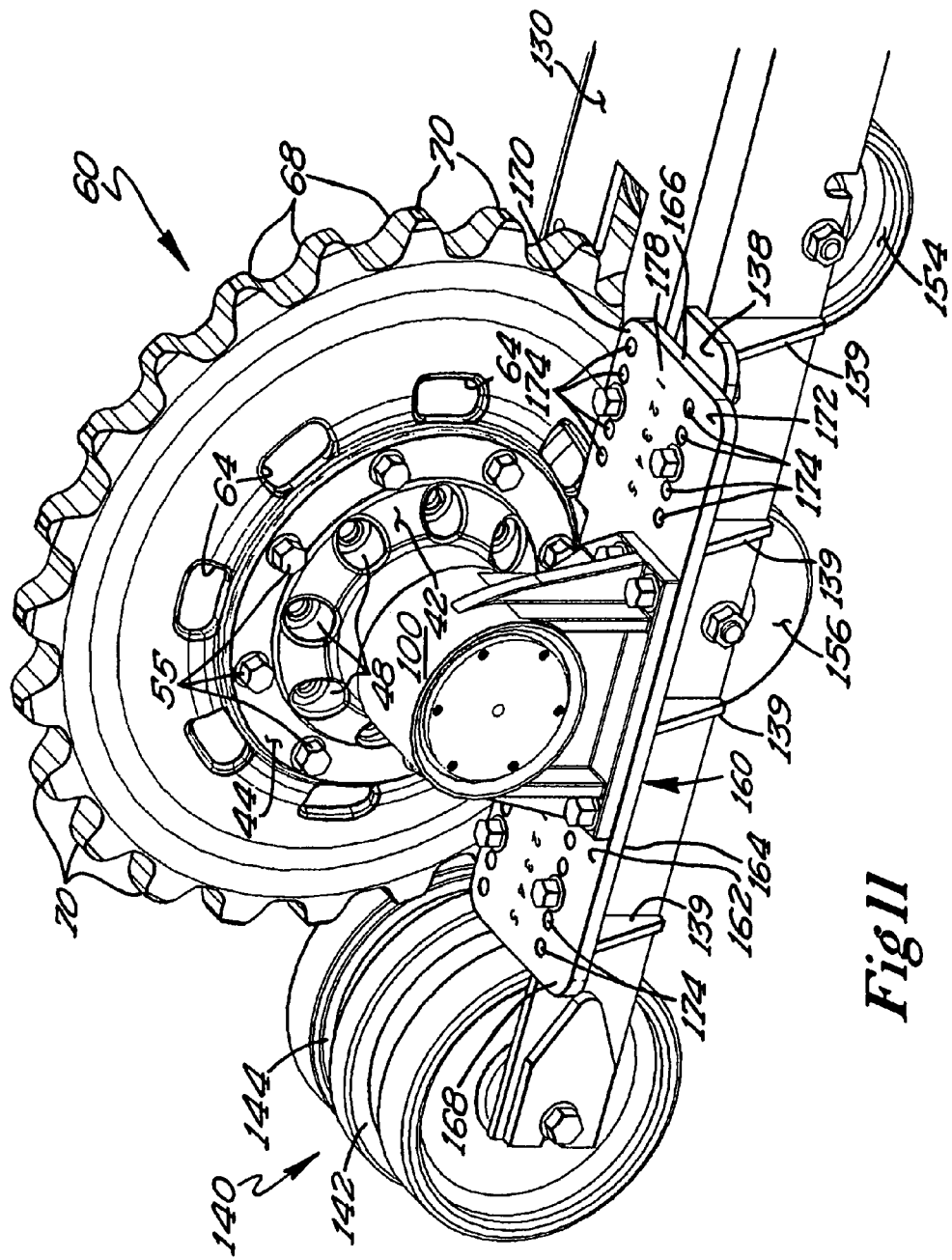
FIG. 11 is a partial, enlarged perspective view of the first or rear hub assembly and the first attachment member of FIG. 9.

FIG. 11 illustrates, in greater detail, the first attachment member 110 as it may be configured for vehicles having a long axle length. For attachment to a long axle length vehicle, the sprocket 60 is attached to the inner attachment surface 52 of the circumferential flange of the first hub assembly (see, FIG. 5) using fastening elements 55. This positions the sprocket 60 so that the plane of the track receiving surface 68 is offset towards the vehicle. Meanwhile, the position of the adaptor plate 160 is reversed so that the side 170 with the cutout 176 now faces inwardly. Note that the first attachment member 100 is positioned adjacent the same side 172 of the adaptor plate as before, however, in this instance, the orientation of the first attachment member 100 is reversed so that it now faces toward the opposite side 170 (the side with the cutout) of the adaptor plate 160.

It will be appreciated that regardless of the axle length to which the track assembly is configured, the adaptor plate 160 will still maintain its ability for adjustment along the length of the support frame in discrete increments, as discussed above. A feature of the adjustable connection between the first attachment member 100 and the support frame 130 is that the adaptor plate 160 and a lateral extension of the support frame (see, FIG. 3) may be provided with identifying indicia 178. The indicia 178 forms a code that corresponds to the adaptor plate attachment locations relative to the support frame 130. When the track assembly 30 is to be attached to a particular vehicle, the user need only refer to the particular vehicle code designations in order to obtain the correct adaptor plate attachment settings.

Figure 12:
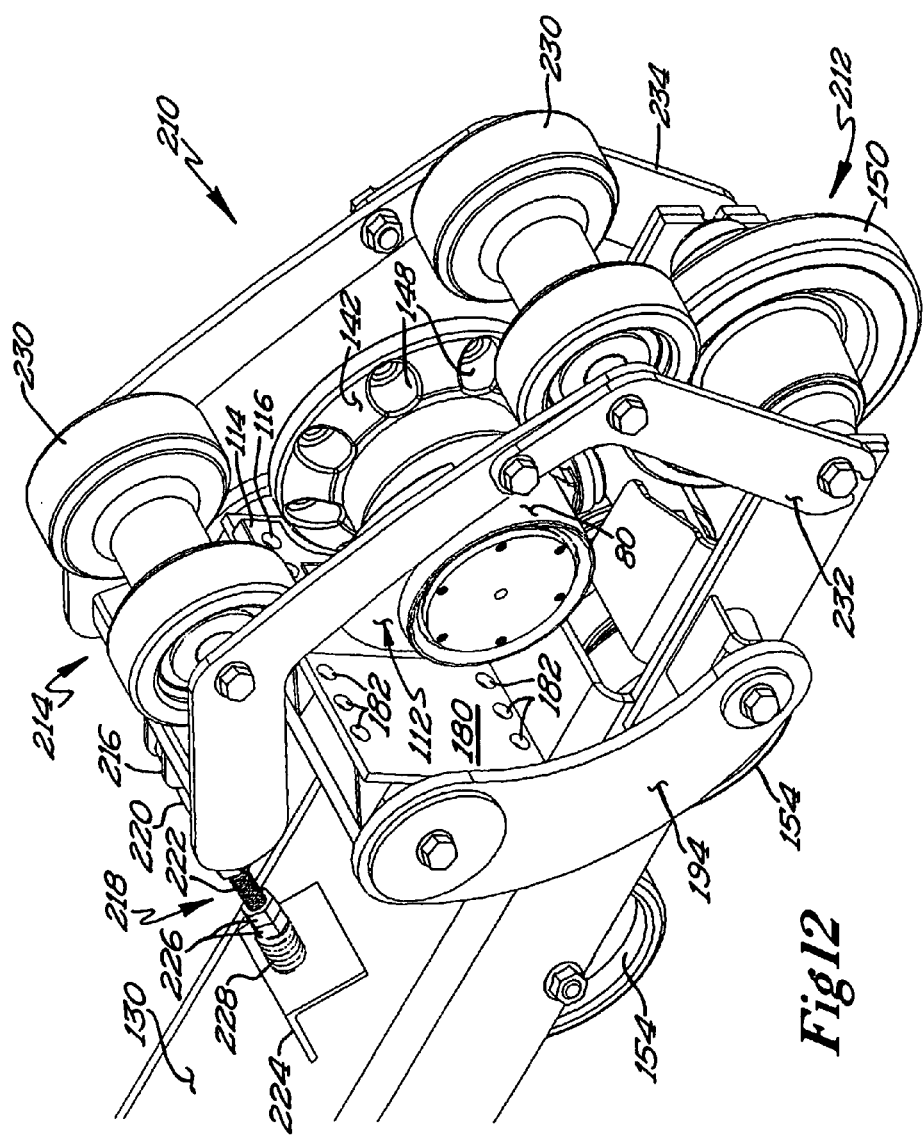
FIG. 12 is a partial, enlarged perspective view of the second or front hub assembly and the second attachment member of FIG. 8.

FIG. 12 illustrates, in greater detail, the second attachment member 112 as it may be configured for vehicles having a short axle length. For attachment to a short axle length vehicle, the second support member 112 is positioned along the second adaptor plate 180 in an inboard position and attached thereto by conventional fastening elements and attachment apertures.

Figure 13:
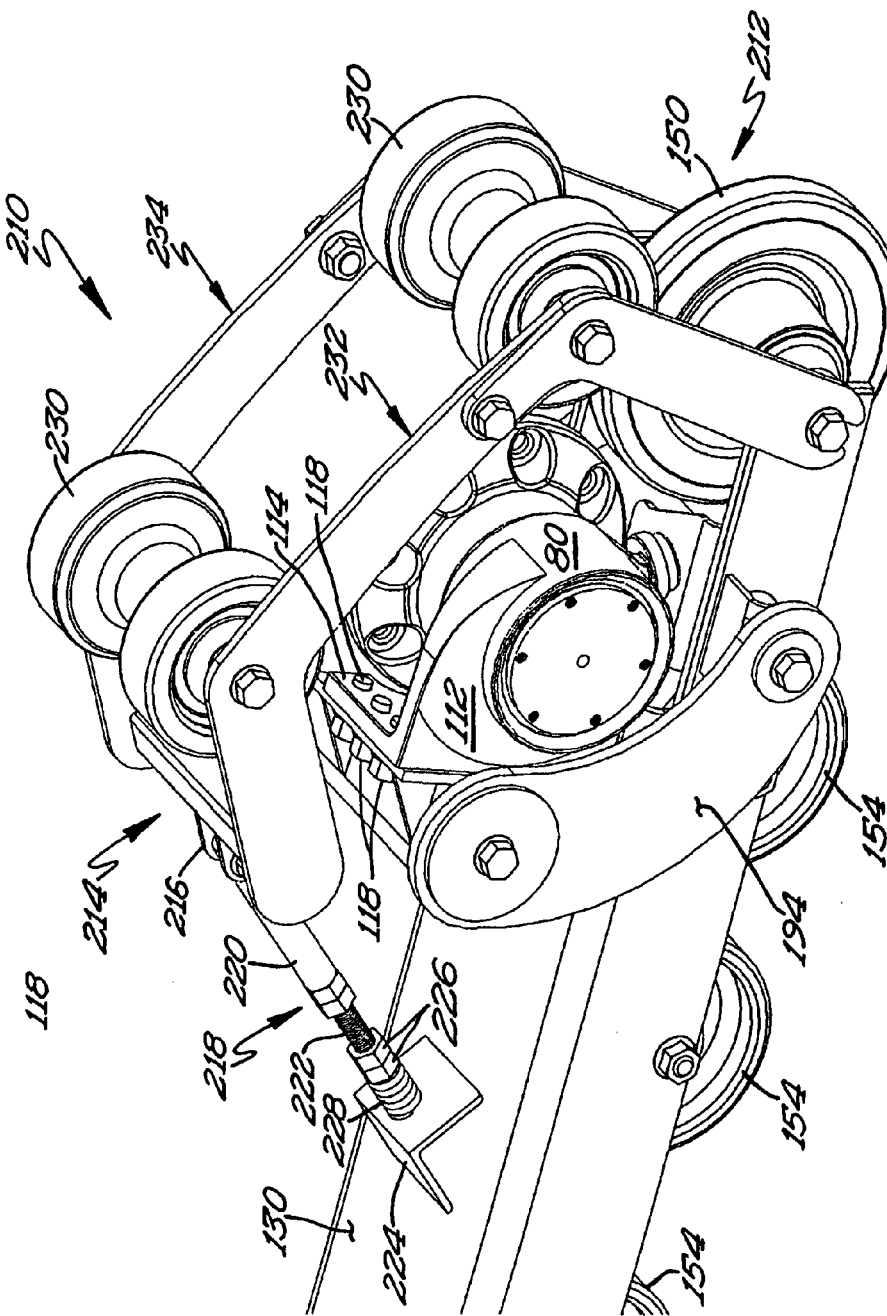
FIG. 13 is a partial, enlarged perspective view of the second or front hub assembly and the second attachment member of FIG. 9.

FIG. 13 illustrates, in greater detail, the second attachment member 112 as it may be configured for vehicles having a long axle length. For attachment to a long axle length vehicle, the second support member 112 is positioned along the second adaptor plate 180 in an outboard position. Note that in this configuration, the second attachment member 112 lies adjacent the first arm of the articulating connection.

Figure 14:
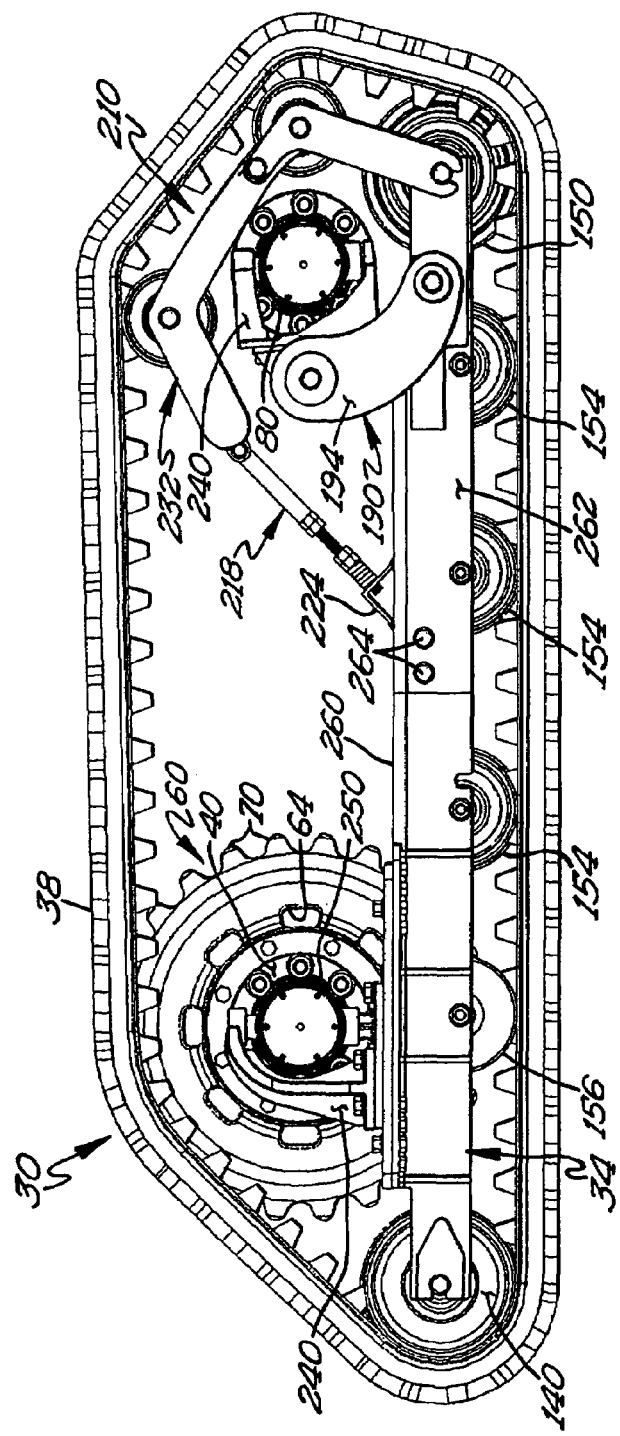
FIG. 14 is a side plan view of another embodiment of the track assembly of the present invention; and, FIG. 15 is a perspective view of the embodiment of the track assembly of FIG. 14.
Figure 15:
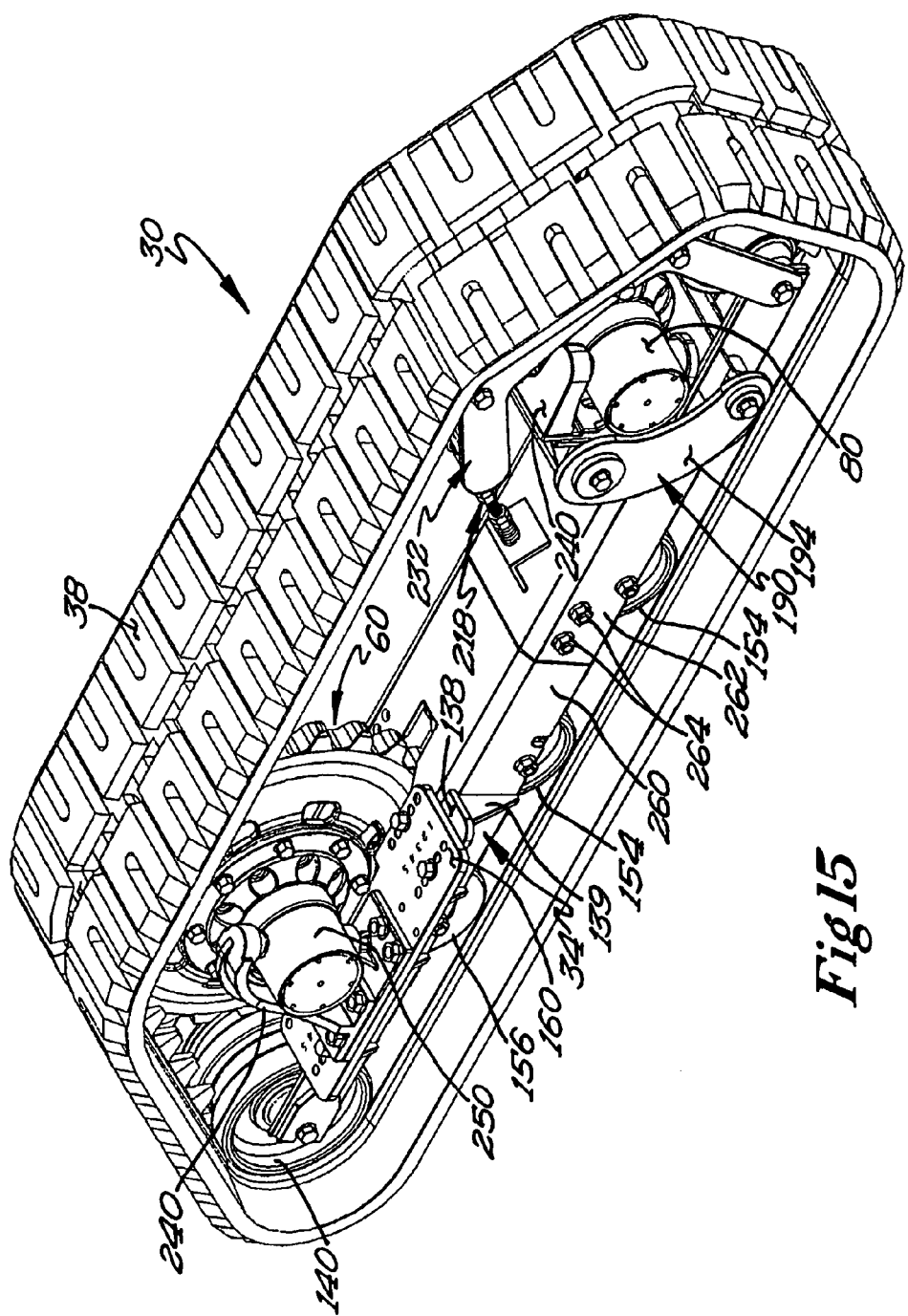

An alternative embodiment of the track assembly is depicted in FIGS. 14 and 15. In this embodiment, the first and second hub assemblies 40 and 80 are connected to the first and second attachment members 240 by pivotal connections, respectively (see the pivotal connection depicted in FIGS. 6 and 7). In addition, the support frame comprises a plurality of elongated sections 262, 262 that are adjustably attached to each other using fasteners such as nuts and bolts 264. The adjustable support frame is preferred when the distances needed to adjust the attachment members relative to the support frame is exceeded. The use of elongated sections 260 and 262 permits the support frame to be adjusted to accommodate vehicles having wheelbase lengths in the range of about 75 cm to about 150 cm. (30 to 60 inches). Preferably, the two elongated sections 260 and 262 can telescope relative to each other, but it will be appreciated that other configurations are possible. For example, it is envisioned that the support frame could comprise two elongated sections that are adjustably attached to each other by a third, center section.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

What is claimed is:

1. An apparatus suitable for use in converting a wheeled vehicle to a tracked vehicle, the apparatus comprising: a first hub assembly configured and arranged to be fastened to a first axle of a vehicle whose wheel has been removed; a second hub assembly configured and arranged to be fastened to a second axle of a vehicle whose wheel has been removed; a support frame having a plurality of support rollers, with at least two of the support rollers spaced apart from each other by a distance that is substantially equal to or greater than a distance between the first and second hub assemblies; a first attachment member configured and arranged to operatively connect the first hub assembly to the support frame; and, a second attachment member configured and arranged to operatively connect the second hub assembly to the support frame; wherein two wheels on one side of a wheeled vehicle may be removed and replaced by the apparatus.

2. The apparatus of claim 1, wherein the first hub assembly further comprises a track receiving surface.

3. The apparatus of claim 2, further comprising a track configured to encircle the first and second hub assemblies and to contact the track receiving surface of the first hub assembly for rolling engagement therewith.

4. The apparatus of claim 1, wherein each of the first and second hub assemblies may be adjusted relative to the support frame to accommodate vehicles having different wheelbase lengths.

5. The apparatus of claim 1, wherein at least one of the first or second hub assemblies may be adjustably positioned from 0.0 cm to about 20.0 cm (0.0 inches to about 8.0 inches) along the length of the support frame with respect to a predetermined point on the support frame.

6. The apparatus of claim 1, wherein at least one of the first or second hub assemblies is configured and arranged for limited movement with respect to the support frame, whereby the apparatus may automatically compensate for vehicles whose wheel axes are misaligned.

7. The apparatus of claim 1, wherein at least one of the first or second hub assemblies is configured and arranged for limited movement with respect to the support frame, whereby the apparatus may automatically compensate for vehicle axles having irregular rotational movement such as runout or wobble.

8. The apparatus of claim 1, wherein at least one operative connection between the first or second hub assemblies and the first or second attachment member is movably attached to the support frame and rotatable about a generally vertical axis with respect thereto, whereby the apparatus is able to accommodate vehicles whose wheel axles are misaligned, or which have irregular rotational movement such as runout or wobble.

9. The apparatus of claim 2, wherein the track receiving surface of the first hub assembly comprises at least one radially extending projection configured to drivingly engage a track.

10. The apparatus of claim 1, wherein the first hub assembly comprises an adaptor disc and a sprocket attachable thereto.

11. The apparatus of claim 10, wherein the sprocket has an attachment surface and a track receiving surface that define planes, which are offset with respect to each other.

12. The apparatus of claim 3, further comprising a suspension system for reducing jolts transmitted to the vehicle when the vehicle travels over an uneven surface.

13. The apparatus of claim 12, wherein the suspension system comprises a resilient member positioned substantially between one of the first or second attachment members and the support frame.

14. The apparatus of claim 12, wherein one of the first or second attachment members comprises an articulating connection, and wherein the resilient member of the suspension system is configured to resist movement of the articulating connection as it moves in response to the vehicle when the vehicle travels over an uneven surface.

15. The apparatus of claim 14, wherein the articulating connection comprises:
a first arm having opposing ends with one end pivotally connected to the support frame;
a second arm having opposing ends with one end connected to the second hub assembly;
with the opposing ends of the first and second arms operatively connected to each other for angular movement therebetween;
wherein the resilient member resists the angular movement between the first and second arms.

16. The apparatus of claim 1, wherein the support frame comprises a plurality of elongated sections with the elongated sections adjustably connectable to each other so that the first and second hub assemblies connected thereto may be adjusted to accommodate vehicles having different wheelbase lengths.

17. The apparatus of claim 16, wherein the distance between which the first and second hub assemblies may be adjusted is in a range of about 70.0 cm to 150.0 cm (about 30 to 60 inches).

18. A track assembly constructed and arranged for mounting on two wheel flanges on one side of a vehicle whose wheels have been removed, the track assembly comprising:
a first hub assembly attachable to a first wheel flange of the vehicle;
a second hub assembly attachable to a second wheel flange of the vehicle;
a support frame operatively connected to the first and second hub assemblies, with the first and second hub assemblies rotatable with respect to the support frame; and,
an endless track configured to encircle the first and second hub assemblies, with the endless track operable to be engaged by only the first hub assembly.

19. The track assembly of claim 18, further comprising first and second rollers each having a rotational axis, with the first and second rollers operatively connected to the support frame in a spaced apart relation, with the first and second rollers configured and arranged to ride upon an inner surface of the endless track as the endless track moves relative to the support frame, and with the first and second rollers defining a ground contacting extent of the endless track.

20. The track assembly of claim 19, wherein the first and second rotational axes of the first and second rollers define a first distance therebetween wherein the first and second rotational axes of the first and second wheel flanges define a second distance therebetween, and wherein the first distance is greater than the second distance.

21. The track assembly of claim 18, wherein the support frame comprises an elongated section having a predetermined length, and wherein one of the first or second hub assemblies is movably adjustable along the length of the elongated section.

22. The track assembly of claim 18, wherein the support frame comprises an elongated section having a predetermined width, and wherein at least one of the first or second hub assemblies is movably adjustable along the width of the elongated section.

23. The track assembly of claim 18, further comprising a first attachment member configured and arranged to movably connect the first hub assembly to the support frame, whereby the track assembly is able to accommodate for runout and/or misalignment of the first hub assembly.

24. The track assembly of claim 23, wherein the first attachment member comprises a resilient member, and wherein the resilient member positioned between the first hub assembly and the first attachment member.

25. The track assembly of claim 24, wherein the resilient member is a sleeve.

26. The track assembly of claim 25, wherein the sleeve comprises elastomeric material.

27. The track assembly of claim 23, further comprising a second attachment member configured and arranged to movably connect the second hub assembly to the support frame, whereby the track assembly is able to accommodate for runout and/or misalignment of the second hub assembly.

28. The track assembly of claim 27, wherein the second attachment member comprises a resilient member, and wherein the resilient member is positioned substantially between the second hub assembly and the second attachment member.

29. The track assembly of claim 28, wherein the resilient member is a sleeve.

30. The track assembly of claim 29, wherein the sleeve comprises elastomeric material.

31. The track assembly of claim 18, further comprising a tensioning member, with the tensioning member operatively connected to the support frame and configured to engage the endless track so that the endless track is spaced from the second hub assembly in a non-contacting relation.

32. The track assembly of claim 31, wherein the tensioning member comprises first and second ends, wherein one of the ends is pivotally connected to the support frame and the other end is adjustable relative thereto.

33. The track assembly of claim 32, wherein the tensioning member comprises at least one upper idler roller for engaging the endless track.

34. The track assembly of claim 31, wherein the tensioning member comprises a pair of spaced apart, generally u-shaped arms with the u-shaped arms configured and arranged to support at least one upper idler roller.

35. In combination with a vehicle having two wheel attachment flanges on one side thereof, a track assembly comprising:
   a first hub assembly attached to a first wheel flange of the vehicle;
   a second hub assembly attached to a second wheel flange of the vehicle;
   a support frame operatively supporting to the first and second hub assemblies, with the first and second hub assemblies rotatable with respect to the support frame; and,
   an endless track encircling the first and second hub assemblies, with the endless track engages only one of the first or second hub assemblies.

36. A method of converting a wheeled vehicle to a tracked vehicle, the method comprising the steps of:
   a. removing a first wheel from a first wheel flange on one side of a vehicle;
   b. removing a second wheel from a second wheel flange on said side of a vehicle; and,
   c. attaching a first track assembly to said first and second wheel flanges of the vehicle, the first track assembly comprising:
      a first hub assembly attachable to a first wheel flange of the vehicle;
      a second hub assembly attachable to a second wheel flange of the vehicle;
      a support frame operatively supporting the first and second hub assemblies, with the first and second hub assemblies rotatable with respect to the support frame; and,
         an endless track encircling the first and second hub assemblies, with the endless track engaged by only one of the first or second hub assemblies.

37. The method of converting a wheeled vehicle to a tracked vehicle of claim 36, wherein the step of attaching the first track assembly to the wheel flanges of the vehicle comprises the steps of:
   i. aligning pre-configured and arranged apertures in the first and second hub assemblies with wheel lugs on the first and second wheel flanges;
   ii. positioning the first track assembly relative to the wheel flanges so that the wheel lugs protrude through the pre-configured and arranged apertures; and,
   iii. fastening the first track assembly to the wheel flanges using wheel lug nuts.

38. The method of claim 36, further comprising the steps of:
   d. removing a first wheel from a first wheel flange on the opposite side of said vehicle;
   e. removing a second wheel from a second wheel flange on said opposite side of said vehicle; and,
   f. attaching a second track assembly to the wheel flanges on said opposite side of said vehicle, the second track assembly comprising:
      a first hub assembly attachable to a first wheel flange of the vehicle;
      a second hub assembly attachable to a second wheel flange of the vehicle;
      a support frame operatively supporting the first and second hub assemblies, with the first and second hub assemblies rotatable with respect to the support frame; and,
      an endless track encircling the first and second hub assemblies, with the endless track engaged by only one of the first or second hub assemblies.

39. The method of converting a wheeled vehicle to a tracked vehicle of claim 38, wherein the step of attaching the second track assembly to the wheel flanges on the opposite side of the vehicle comprises the steps of:
   i. aligning pre-configured and arranged apertures in the first and second hub assemblies with wheel lugs on the wheel flanges on the opposite side of the vehicle;
   ii. positioning the second track assembly relative to the wheel flanges so that the wheel lugs protrude through the pre-configured and arranged apertures; and,
   iii. fastening the second track assembly to the wheel flanges using wheel lug nuts.

40. The apparatus of claim 1, further comprising a track configured to encircle the first and second hub assemblies, with the track contacting only one of the first or second hub assemblies.

41. The apparatus of claim 10, wherein the sprocket is dish-shaped and has first and second attachment surfaces, and wherein the sprocket may be attached to the adaptor disc by either one of the first or second attachment surfaces.

* * * * *

UNITED STATES PATENT AND TRADEMARK OFFICE
CERTIFICATE OF CORRECTION

| | | |
|---|---|---|
| PATENT NO. | : 7,255,184 B2 | Page 1 of 1 |
| APPLICATION NO. | : 10/751101 | |
| DATED | : August 14, 2007 | |
| INVENTOR(S) | : Loegering et al. | |

It is certified that error appears in the above-identified patent and that said Letters Patent is hereby corrected as shown below:

DETAILED DESCRIPTION

At column 7, line 35, delete "unshaped" and insert therefore --u-shaped--

At column 7, line 38, delete "shaped" and insert therefore --u-shaped--

At column 9, line 30, delete "my" and insert therefore --may--

Signed and Sealed this

Sixth Day of November, 2007

JON W. DUDAS
*Director of the United States Patent and Trademark Office*